United States Patent [19]

Goglio

[11] Patent Number: 4,948,610
[45] Date of Patent: Aug. 14, 1990

[54] PROCEDURE FOR THE PRODUCTION OF COOKED HAM

[76] Inventor: Luigi Goglio, via Solari 10, Milan, Italy

[21] Appl. No.: 317,848

[22] Filed: Mar. 2, 1989

[30] Foreign Application Priority Data

Mar. 10, 1988 [IT] Italy .................................. 19723 A/88

[51] Int. Cl.⁵ .......................... A23B 4/005; A23L 3/02
[52] U.S. Cl. .................................... 426/392; 426/412; 426/414
[58] Field of Search .................. 426/392, 412, 414

[56] References Cited

U.S. PATENT DOCUMENTS

| | | | |
|---|---|---|---|
| 3,663,233 | 5/1972 | Keszler | 426/281 |
| 3,775,134 | 11/1973 | Michels et al. | 426/392 |
| 4,285,980 | 8/1981 | Lewis | 426/414 |
| 4,287,218 | 9/1981 | Rich et al. | 426/281 |
| 4,574,087 | 3/1986 | Sheehy et al. | 426/392 |
| 4,606,922 | 8/1986 | Schirmer | 426/412 |
| 4,672,793 | 6/1987 | Terlizzi, Jr. et al. | 426/414 |
| 4,820,536 | 4/1989 | Lippincott et al. | 426/412 |

FOREIGN PATENT DOCUMENTS 847277 7/1970 Canada .............................. 426/392

Primary Examiner—Donald E. Czaja
Assistant Examiner—D. Workman

[57] ABSTRACT

A procedure for the production of a cooked ham in which the meat is injected with a brine placed in a bag with a drainage valve which allows for drainage during heating. The valve is sterilized and sealed after heating.

2 Claims, 1 Drawing Sheet

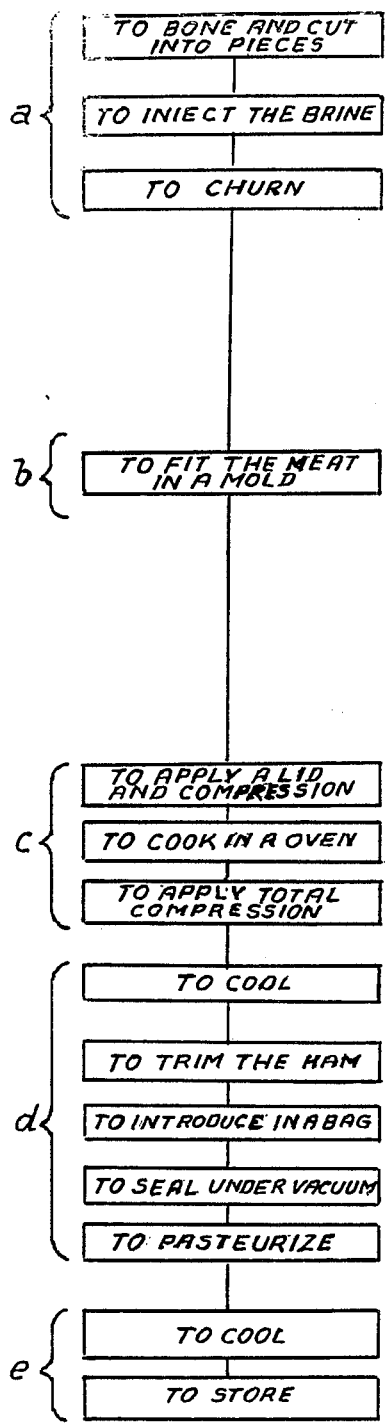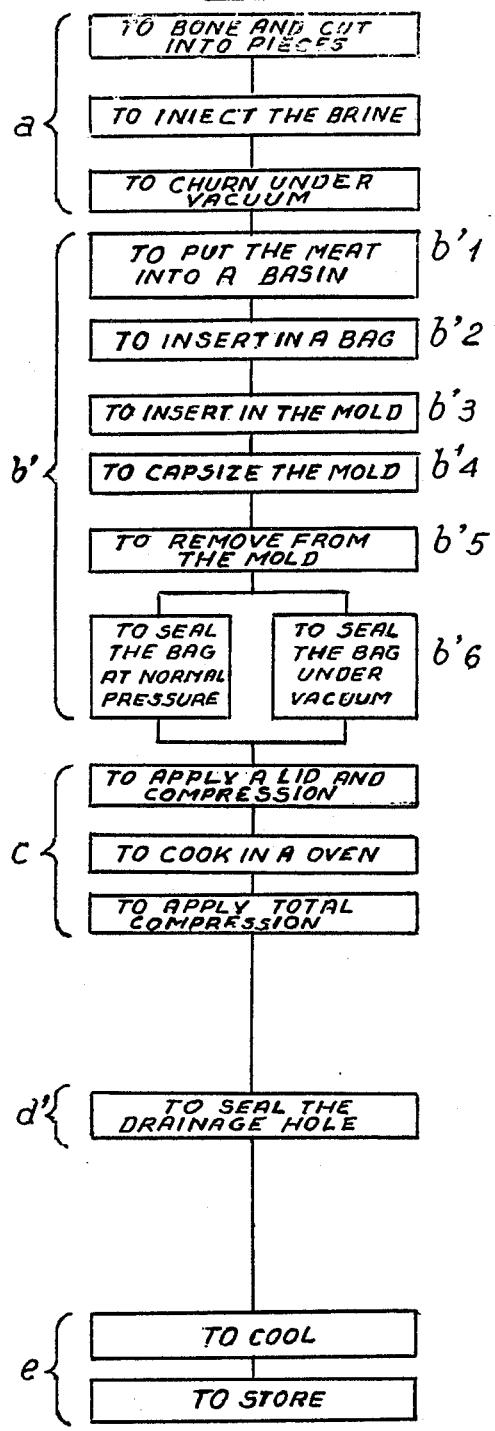

4,948,610

PROCEDURE FOR THE PRODUCTION OF COOKED HAM

Summary

The invention relates to a procedure for the production of cooked ham, which does away with the need for an operator's intervention so as to avoid dangerous contamination and successive sterilization procedures. This aim is achieved by substituting the traditional phase of arranging the meat in a mold with a number of automated phases; these phases consist of automatic arrangement of the meat in the mold, insertion of the shaped meat chunk in a bag, heat sealing under vacuum or in atmosphere. In addition the procedure eliminates the successive phases, usually performed after cooking and final pressing, which consist in cooling the ham, in its trimming to remove any parts which may alter its shape, its insertion in the bag its packing under vacuum and pasteurization, which are substituted with a single operation, according to this invention, by sealing of a drainage aperture previously provided in the bag. The traditional final phases of cooling the ham and its storage are performed successively.

DECRIPTION OF INVENTION

This invention relates to a procedure for the production of cooked ham.

The traditional procedure for the production of high quality cooked ham consists of various processing phases requiring handling by operators of the meat used to produce the cooked ham, which handling still necessitates successive sterilization and pasteurization to ensure proper conservation of the product.

The purpose of this invention is to do away to the maximum possible extent with the intervention of human operators, as well as excessive handling after cooking, all of which would cause unwanted dangerous contamination that would then require further heat treatments for sterilization of the product.

The scope of the invention is achieved by substituting the usual phase of arranging the precooked meat in a mold with successive more or less automated phases which eliminate manual handling of the meat after it has been cooked. Such handling includes the setting of the meat in a first mold, its automatic introduction in a bag which is either heat sealed or not under vacuum, thereby eliminating the usual successive phases which are normally performed after cooking and final pressing and which consist in cooling the ham, its trimming to eliminate any parts that could alter its desired shape, its introduction in a bag, its packing under vacuum and pasteurization.

According to this invention, all of these phases are replaced by the heat sealing of a drainage hole previously provided in the packaging bag. The traditional cooling and storage procedures of the ham are performed subsequently.

The invention will now be described in conjunction with the annexed drawing, in which:

FIG. 1 is a flow diagram showing the various phases adopted in the usual production procedures of cooked ham;

FIG. 2 is a flow diagram showing the various production steps for the production of cooked ham according to this invention.

The usual procedure for production of a high quality cooked ham is described hereafter with reference to FIG. 1.

(a) The meat, obtained by boning of a chunk of butchered animal, is reduced to pieces of the desired size and subjected to brine injection and churning, (b) after this, the meat is fitted manually in a shaped mold provided with a lid.

(c) The lid, which has a rack type securing system and compressible springs, acts to pressurize the meat contained in said mold; the mold is then placed in an oven, and successively its lid is again adjusted to restore a pressure apt to ensure an adequate compacting of the meat, the volume of which will have diminished in the cooking phase. In this manner air or fat pockets inside the chunk are also avoided.

(d) After cooking, the ham contained in the mold is cooled in a cooling cell and successively picked up by an operator who provides to trim it manually, with consequent bacterial contamination, and it is then introduced manually in a bag which can be also contaminated, as it is open. The ham in the bag is vacuum sealed, after which the package is subjected to pasteurisation to improve conservation.

(e) The above procedures are followed by cooling phases in a cooling cell and successive storage. According to this patent the first conventional step (a) is performed, in which the meat obtained from the boning of a chunk of butchered animal meat is reduced to pieces of the desired size and subjected to brine injection and to churning. In the present invention, phase (b) involving the usual introduction of the meat in a shaping mold is substituted by a phase (b') comprising the following subphases:

(b'1) placing of the meat in a collecting basin (b'2) insertion of the packaging bag over said collecting basin with its open mouth directed downward. The wall of the bag opposite to an opening is provided with a suitably shaped drain valve, apt to allow discharge of liquids from the bag during the successive cooking of the ham, to eliminate the fats that liquify during said cooking.

(b'3) placement of a pressing mold in an upside down position with its opening facing downward over said bag.

(b'4) capsizing by 180° rotation of the assembly formed by the basin, bag and mold, (b'5) removal from the basin of the bag filled with meat, and (b'6) sealing of the mouth of the bag possibly having created a vacuum in its interior.

Phase (c) of the usual procedure follows next; it includes fitting of the cover on the mold with application of pressure, cooking in the oven with elimination of the excess fat which melts as a result of the heat, its drainage through said drain valve in the wall of the bag, and further adjustment of the pressure on the meat through the cover to maintain adequately pressurized the meat which has undergone a reduction in volume in the cooking phase.

In accordance with the present invention, at this point the various usual operations of phase (d) are substituted with a single operation identified as (d') Comprising the application of a jet of steam in the zone of the drainage hole to clean and sterilize the bag and the ham around said zone and then closing of the drain hole by thermo-sealing.

The processing cycle terminates with cooling of the ham packed in the sealed bag in a cooling cell, and its successive storage.

Sub phase (b'6) can be effected at atmospheric pressure with the formation of a partial vacuum consequent to the cooking, compression sealing and cooling, or under vacuum.

As it can immediately be seen, from the positioning phase of the meat to the storage phase, the ham never comes in contact with the hands of an operator and it is not subjected to pasteurization to ensure its longer conservation. This reduces the time of treatment and avoids also a further heating of the product for pasteurization, which can alter its quality.

I claim:

1. A process for the production of high quality cooked ham comprising, after the injection of the brine in the meat and before cooling in the cooling cell and storage of the cooked ham, the steps of:
   a. churning the meat under vacuum;
   b. placing the meat in a collecting basin;
   c. insertion of a packaging bag provided, on one side, with a discharge hole to which a drainage valve is applied, with the open mouth of said bag directed downward;
   d. insertion of a mold over the closed end of said bag, with the opening of said mold pointing downward;
   e. overturning of the assembly formed by said basin, bag and mold by a rotation of 180°;
   f. removal of said basin from said bag;
   g. sealing of the mouth of said bag;
   h. application of a pressing cover on said mold containing the meat, cooking in the oven, and finally compressing the meat to compensate for its reduction in volume due to cooking; and
   i. application of a steam jet at the zone around said drain hole to clean and sterilize said bag and ham, and closing by heat sealing of said drain hole in the wall of said packaging bag at the point of said drainage valve.

2. The process as set forth in claim 1, wherein said sealing of said mouth of said bag is effected under a vacuum or suction condition.

* * * * *